United States Patent [19]

Grosspietsch et al.

[11] Patent Number: 5,307,915
[45] Date of Patent: May 3, 1994

[54] FLUID-ACTUABLE RELEASER FOR A FRICTION CLUTCH

[75] Inventors: Wolfgang Grosspietsch; Herbert Voit, both of Schweinfurt; Gottfried Mader, Ebelsbach; Manfred Wehner, Schweinfurt; Karl Müller, Poppenhausen, all of Fed. Rep. of Germany

[73] Assignee: Fichtel & Sachs AG, Schweinfurt, Fed. Rep. of Germany

[21] Appl. No.: 942,930

[22] Filed: Sep. 10, 1992

[30] Foreign Application Priority Data

Sep. 13, 1991 [DE] Fed. Rep. of Germany ....... 4130525

[51] Int. Cl.⁵ .................. F16D 23/14; F16D 25/08
[52] U.S. Cl. .................. 192/98; 192/84 CA 91 A; 92/107; 92/171.1
[58] Field of Search ............... 192/98, 91 A, 85 CA; 92/107, 171.1

[56] References Cited

U.S. PATENT DOCUMENTS

| | | | |
|---|---|---|---|
| 4,102,446 | 7/1978 | Rist | 192/91 A |
| 4,399,898 | 8/1983 | Olschewski et al. | 192/98 |
| 4,650,054 | 3/1987 | Fädler | 192/85 CA |
| 4,869,355 | 9/1989 | Corral et al. | 192/98 |
| 4,960,193 | 10/1990 | Hodge | 192/91 A |

FOREIGN PATENT DOCUMENTS

| | | |
|---|---|---|
| 0168932 | 1/1986 | European Pat. Off. |
| 3427791 | 1/1986 | Fed. Rep. of Germany ... 192/91 A |
| 1373479 | 11/1974 | United Kingdom . |
| 2112490 | 7/1983 | United Kingdom . |

Primary Examiner—Richard M. Lorence
Attorney, Agent, or Firm—Brumbaugh, Graves, Donohue & Raymond

[57] ABSTRACT

The invention relates to a fluid-actuable releaser in which an annular piston (6) is guided in a casing (3) which is provided with a sleeve (10) for guiding the annular piston (6) radially internally and for sealing purposes, the sleeve (10) being axially fixed by partial plastic deformation after insertion into the casing (3) with its external diameter in a bore (16) in the casing (3).

14 Claims, 3 Drawing Sheets

FLUID-ACTUABLE RELEASER FOR A FRICTION CLUTCH

BACKGROUND OF THE INVENTION

The invention relates to a fluid-actuable releaser for a friction clutch of a motor vehicle.

An annular cylindrical clutch releaser is known from EP-B-168 932 in which an annular piston is movably guided with its external diameter in a bore of a casing. With its internal diameter, the annular piston is guided on a sleeve which passes at one end into a radially outwardly projecting annular flange with which it is fastened in a sealed manner on the casing. The casing forms a pressure chamber together with one face end of the annular piston as well as the sleeve and the annular flange projecting from the sleeve. The piston carries a release bearing at the end remote from the pressure chamber. Although the known releaser can be produced with few constructional elements, it poses production problems as the sleeve guiding the annular piston radially internally has to be machined precisely close to its radially projecting annular flange and exact centering of the annular flange and adequate sealing of the annular flange relative to the casing have to be ensured.

SUMMARY OF THE INVENTION

An object of the invention is to improve a fluid-actuated releaser of the above-described type such that it may be produced simply and very precisely and is also adapted for continuous operation.

The invention is based on a fluid-actuable releaser for a friction clutch of a motor vehicle which comprises the following features: a casing with a first bore, a sleeve which is arranged in the first bore, limits an annular cylindrical chamber therewith and is fastened in a sealed manner on the casing and an annular piston which is movably guided in the annular cylindrical chamber on the first bore and carries at one end a seal limiting a fluid pressure chamber, in particular a hydraulic pressure chamber, in the annular chamber and, at its end remote from the pressure chamber, a release bearing.

According to the invention, it is proposed with such a releaser that the casing has, on the side axially remote from the annular piston, an annularly radially inwardly extending rib with a second bore concentric to the first bore and two annular shoulders which point axially away from one another and issue from the second bore. The sleeve penetrates with its cylindrical external face limiting the annular chamber into the second bore and is radially guided here. The sleeve is further provided with radially outwardly projecting stop means which axially fix the sleeve on the two shoulders of the rib, wherein the stop means which fix the sleeve on the shoulder pointing axially from the pressure chamber are integrally shaped from radially inwardly to radially outwardly on the sleeve by plastic deformation of the sleeve.

Owing to the proposed construction it is possible to produce the sleeve purely cylindrically at its external diameter over its entire axial range and this demands particularly low expenditure even if machining has to be carried out to improve the surface. The sleeve of which the shape has thus been precisely produced is inserted with its pressure chamber end into the bore in the casing, is sealed from the casing and is fixed by plastic deformation from radially inwardly to radially outwardly at least in an axial direction. Plastic deformation in the region of guidance in the casing has no detrimental effects on the remainder of the sleeve and the original machining of the sleeve at its external diameter is not affected by projecting regions of the sleeve In comparison with the prior art, simple, precise production of the sleeve from simple tubular elements is possible and the connection to the casing may be produced without difficulty.

According to a further feature of the invention, the sleeve has, axially next to the region of deformation but still in the axial region of the bore of the rib, a radially outwardly open peripheral groove for receiving a sealing ring. The seal via the sealing ring is simultaneously produced by this sealing ring during insertion of the sleeve into the casing.

A possible type of step for axial fixing of the sleeve relative to the casing is provided by an encircling groove. The region of deformation of the sleeve is urged into this groove so that the sleeve is fixed in both axial directions after the assembly process.

However, it is also possible to use one axial lateral face or shoulder of the rib in the casing for axial fixing purposes, in that the end of the sleeve is radially outwardly plastically deformed and comes to rest on this lateral face. With this design, a securing ring is provided for the opposite axial direction, which securing ring is arranged in a groove in the external diameter of the sleeve, projects beyond the external diameter of the sleeve and comes to rest on the other axial lateral face or shoulder of the rib during insertion. The production of a groove in the internal diameter of the rib is superfluous with such a design.

It may be advantageous for the sleeve to be thin-walled in design in its region of deformation, more specifically by enlargement of its internal diameter in this region. Plastic deformation can therefore be carried out without great deformation work.

In particular with a hydraulically actuated releaser having a plastically deformed sleeve for guiding the hydraulically actuated annular piston, a double releaser may be produced with low expenditure by means of a casing which is stepped in the radially external region and a corresponding stepped piston, for example of the modular design type. This stepped piston can advantageously be pneumatically actuated since this stepped piston has a greater diameter than the annular piston.

The stepped piston is preferably provided with a self-centering release bearing, the non-rotating external bearing ring being held on an end face, extending perpendicularly to the release direction, of an encircling rib by peripherally distributed spring clips which act with one end on the external bearing ring and of which the other ends are shaped into a loop and rest resiliently on the side of the rib remote from the bearing. The arrangement of these individual spring clips allows very simple assembly of the release bearing on the stepped piston.

The spring clips are therefore fixed radially on the one hand by a nose which projects from the end of the loop in the direction of the rib and engages there in a corresponding opening and, on the other hand, by the other end of the clip positively surrounding a combined supporting and sealing disc centred on the non-rotating bearing ring. This supporting and sealing disc is thus simultaneously fixed in the axial direction.

The hydraulically actuable annular piston is also equipped with a self-centering release bearing. For this purpose, the annular piston has an annular flange at the end remote from the pressure chamber. The annular flange serves simultaneously to support a bias spring which is arranged radially inside the sleeve and rests with its other end via a supporting sleeve on the end face of the sleeve. The supporting sleeve is inserted with its cylindrical part into the internal diameter of the sleeve and is held axially by a radially projecting collar. The supporting sleeve also has a radially inwardly directed collar at its other end, on which the other end of the biasing spring rests. This arrangement is very compact and simultaneously serves as an axial stop for the annular piston in order to secure the position of maximum extension. For this purpose there is arranged, radially inside the biasing spring, a stop sleeve having, on the one hand in the region directed away from the release bearing, a guide region which rests on the internal diameter of the sleeve. In the other end region of the stop sleeve there are provided radially resilient tongues as well as an encircling, radially outwardly open groove with which a positive connection may be produced between the stop sleeve and the annular flange. This produces, on the one hand, dust protection for penetration of dirt from radially internally into the annular piston region and, on the other hand, an axial stop for the annular piston over the guide region of the stop sleeve.

The various features of novelty which characterize the invention are pointed out with particularity in the claims annexed to, and forming part of, this disclosure. For a better understanding of the invention, its operating advantages and specific objects attained by its use, reference should be had to the accompanying drawings and descriptive matter in which there are illustrated and described preferred embodiments of the invention.

DESCRIPTION OF PREFERRED EMBODIMENTS

Figure 1:
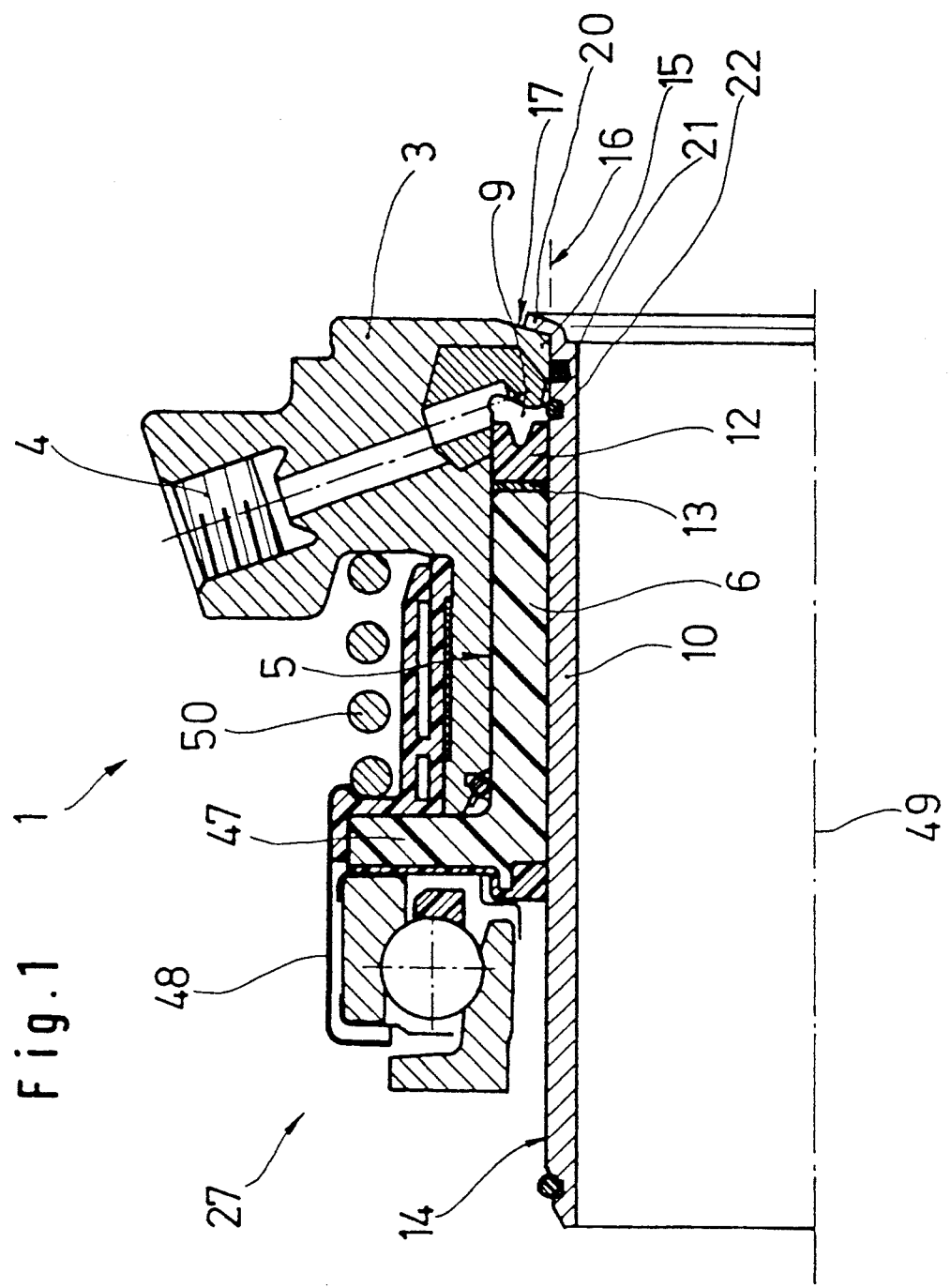
FIG. 1 is the upper half of a longitudinal section through a hydraulically actuable releaser.

The releaser 1 shown in FIG. 1 is arranged concentrically to an axis of rotation 49 round which a gear shaft (not shown) can rotate It comprises a single-part casing 3 with a fluid connection 4, actuation being brought about by a hydraulic medium in the present case. The casing 3 is provided with a bore 5 into which an annular piston 6 is inserted axially movably with its external diameter. The annular piston 6 projects partially from the bore 5 and is provided there with a substantially radially extending flange 47 on whose end face extending perpendicularly to the axis of rotation 49 or to the release movement a release bearing 27 is supported. The annular piston 6 is guided radially internally relative to the casing 3 by a sleeve 10, the sleeve 10 being inserted firmly and tightly in a rib 15 in the casing 3. The rib 15 has, for this purpose, a bore 16 of which the diameter corresponds to the external diameter 14 of the sleeve 10. The end of the annular piston 6 extending into the casing 3, together with a supporting ring 13 and a groove sealing ring 12 as well as the casing 3 and the sleeve 10, forms a pressure chamber 9 communicating with the fluid connection 4. The sleeve 10 is produced from a purely cylindrical part and has a uniformly continuous external diameter during the production process. Two encircling grooves of which one receives a securing ring 22 and the other a sealing ring 21 are introduced into this external diameter in the region corresponding to the rib 15 of the casing 3, after assembly. The sealing ring 21 is arranged such that it comes to rest opposite the bore 16 of the rib 15 after assembly and provides a hydraulic seal relative thereto. For assembly of sleeve 10 and casing 3, the sleeve 10 is introduced from the side of the release bearing 27 into the bore 16 of the casing 3 until the securing ring 22 comes to rest on the step or shoulder formed by the rib. The sleeve 10 then projects partially beyond the end of the bore 16 and there forms a deformation region 20 which is shaped plastically radially outwardly and therefore comes to rest on the axial limit of the rib 15 formed by a shoulder or step 17. The sleeve 10 is therefore axially positively fastened in the casing 3. The pressure chamber 9 is simultaneously outwardly sealed by the sealing ring 21. The sleeve 10 may be thinner in diameter in its deformation region 20 than in the other regions, the internal diameter of the sleeve blank being increased in the subsequent deformation region 20. After assembly of sleeve 10 and casing 3, the annular piston 6 may be inserted with the supporting disc 13 and with the groove sealing ring 12 between external diameter 14 and bore 5. The release bearing 27 is axially resiliently fastened on the flange 47 in the conventional manner by friction via a claw spring 48. A biasing spring 50 is also arranged between the flange 47 and the casing 3.

Owing to the above-described assembly of the sleeve 10 on the casing 3, the sleeve 10 may be prepared as a component which is purely cylindrical at the external diameter and is therefore easy to produce, the two grooves for the securing ring 22 and the sealing ring 21 not projecting radially outwardly. This allows simple and inexpensive production of the sleeve 10. The sleeve is radially outwardly plastically deformed in its deformation region 20 and therefore axially fixed only when the sleeve 10 has been introduced with its external diameter into the bore 16 of the rib 15 until the securing ring 22 strikes the rib 15.

Figure 2:
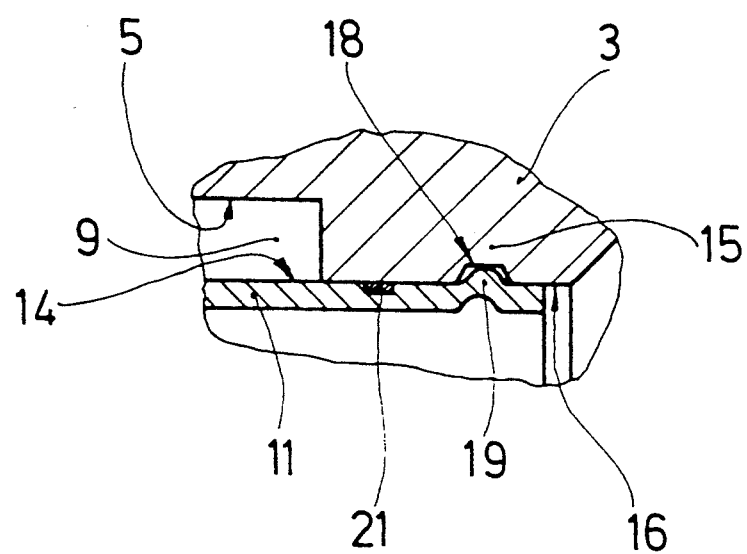
FIG. 2 is a detail of a variation of the releaser from FIG. 1 with a different method of fastening the sleeve.

FIG. 2 shows a variation of the releaser from FIG. 1. The differences merely reside in the fact that axial fixing may be achieved without a securing ring as an encircling groove 18 into which a deformation region 19 of the sleeve 11 extends due to the deformation process, is arranged in the bore 16 of the rib 15 of the casing 3. Fixing by the deformation region 19 and the groove 18 is therefore achieved for both axial directions. The sealing ring 21 is arranged axially next to the deformation region 19. The other reference numerals are already described in the description of FIG. 1. The advantages of the construction have basically also already been described in detail and, in addition, the securing ring 22 from FIG. 1 and the corresponding groove are dispensed with here.

Figure 3:
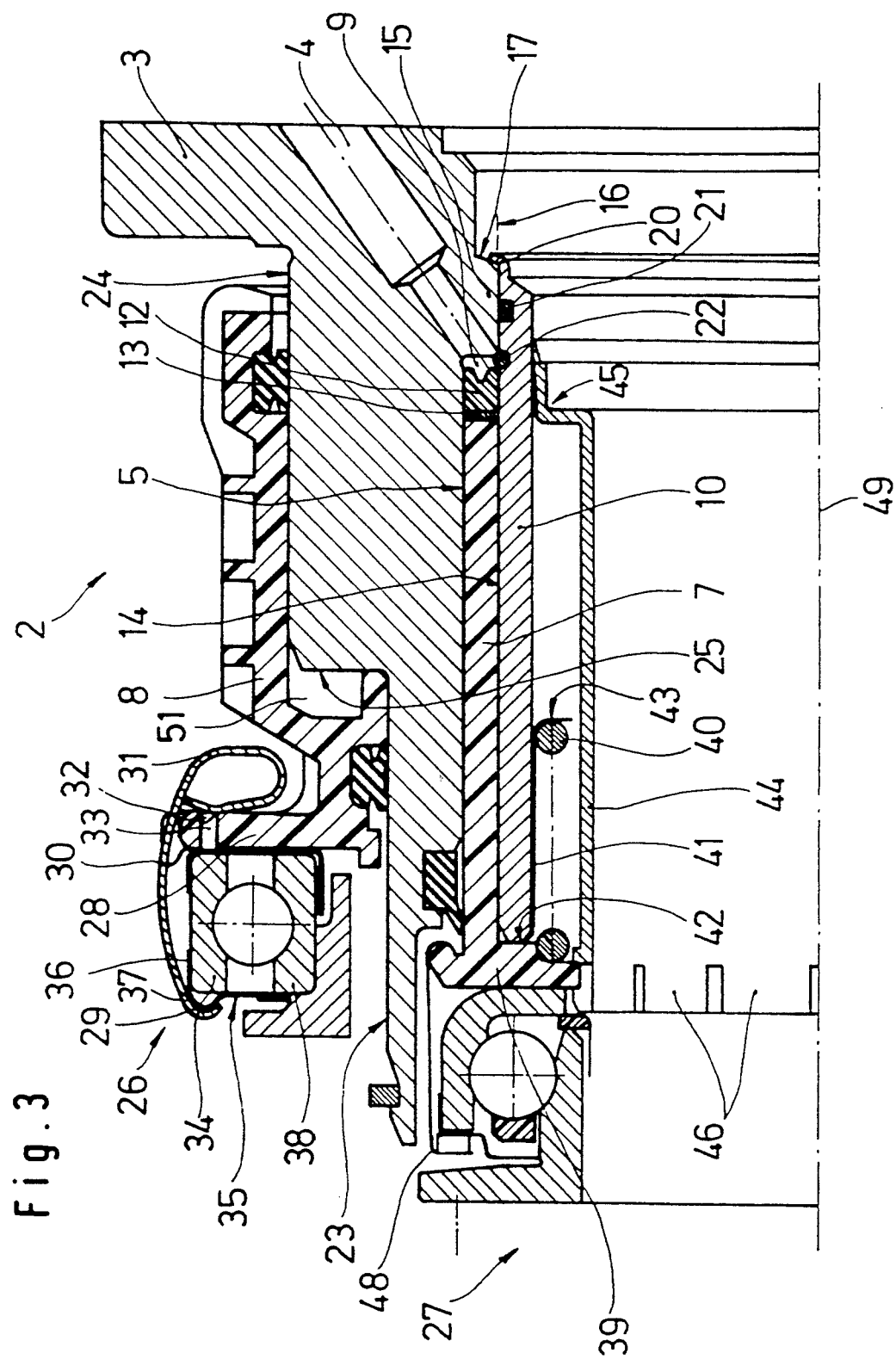
FIG. 3 is the upper half of a longitudinal section through a double release system with a hydraulic and a pneumatically actuable releaser.

FIG. 3 shows a releaser 2 in the form of a double releaser. The radially internally located releaser with the release bearing 27 is designed according to the releaser 1 in FIG. 1 and the radially externally located releaser with a release bearing 26 is produced by a stepped piston 8 which is placed on the stepped casing 3 and is preferably pneumatically actuated. Reference is made to the illustration in FIG. 1 with respect to the annular piston 7 of the radially internally located releaser and its guidance by the bore 5 and by the sleeve 10, as the production and assembly of the sleeve 10 are carried out according to FIG. 1 here. The reference numerals used here correspond to those in FIG. 1. In contrast to FIG. 1, the arrangement of a biasing spring 40 is selected with the internally located releaser. The annular piston 7 has, at its end facing the release bearing 27, an annular flange 39 which projects both radially outwardly and radially inwardly. The radially outwardly projecting region is used for fastening the above-described claw spring 48. The radially inwardly projecting region serves for the axial fastening of a stop sleeve 44 which extends axially substantially equally as far as the annular piston 7 and has a guide region 45 in its end region, more specifically opposite the internal diameter of the sleeve 10. At the end of the stop sleeve 44 facing the release bearing 27 there are provided a plurality of peripherally distributed radially resilient tongues 46 having an outwardly open encircling groove with which the tongues 46 are axially positively attached radially resiliently on the annular flange 39. This results in positive entrainment between annular piston 7 and stop sleeve 44. The biasing spring 40 is arranged in the radial chamber between the stop sleeve 44 and the internal diameter of the sleeve 10, more specifically such that it rests with one end on the annular flange 39 and with its other end on a supporting sleeve 41 which has an axially shorter range than the stop sleeve 44. The supporting sleeve 41 is fixed at the face end of the sleeve 10 by a radially outwardly projecting collar 42 and, at its other end, has a radially inwardly directed collar 43 which serves to support the biasing spring 40. The supporting sleeve 41 is inserted firmly into the internal diameter of the sleeve 10 so that it represents, with its collar 43, an axial stop for the guide region 45 of the stop sleeve 44 when the maximum possible extension of the annular piston 7 is achieved. The stepped piston 8 is axially movably guided on two corresponding external diameters 23 and 24 of the casing 3 at the radially external region of the casing 3. The two external diameters 23 and 24 are connected to one another by a substantially radially extending step 25. A pressure chamber 51 formed by the step 25 and the annular piston 8 may be filled via compressed air for actuating the release bearing 26. The release bearing 26 is arranged in a known manner as a self-centering release bearing, a plurality of peripherally distributed spring clips 30 holding the bearing 26 with axial friction relative to the rib 28. The clips 30 are attached by one end 34 to a curved supporting and sealing disc 35 which is fixed via a collar 36 on the non-rotating external ring 29. The other ends of the spring clips 30 are curved in each case to form a loop 31 and rest with the resilient loop end on the rear of the rib 28. For radial fixing, a nose 32 which engages positively in a corresponding opening 33 in the rib 28 is angled in the direction of the rib 28 in this region in each case. These clips 30 are simple to produce and simple to fit and they not only keep the complete bearing 26 in continuous frictional engagement with the rib 28 but at the same time keep the supporting and sealing disc 35 in its axial position. The supporting and sealing discs 35 are provided with a bulge 37 which passes into the cylindrical collar 36. The bulge 37 serves for the attachment of the curved ends 34 of the clips 30. An internal ring 38 or a component connected thereto serves to transmit the force of the release movement to the friction clutch (not shown).

While specific embodiments of the invention have been shown and described in detail to illustrate the application of the inventive principles, it will be understood that the invention may be embodied otherwise without departing from such principles.

What we claim is:

1. A fluid-actuable releaser for a friction clutch of a motor vehicle, comprising
   a casing (3) with a first bore (5);
   a sleeve (10) which is arranged in the first bore (5), which therewith delimits an annular cylindrical chamber, and which is fastened in a sealed manner on the casing (3); and
   an annular piston (6; 7) which is movably guided in the annular cylindrical chamber on the first bore (5), which carries at one end a seal (12) delimiting a fluid pressure chamber (9) in the annular cylindrical chamber, and which carries, at another end remote from the fluid pressure chamber (9), a release bearing (27),
   wherein the casing (3) has, on a side axially remote from the annular piston (6; 7), an annularly, radially inwardly extending rib (15) with a second bore (16) concentric to the first bore (5) and with two annular shoulders (17; 18) having axially oppositely directed faces originating at the second bore (16),
   wherein the sleeve (10) penetrates radially guided by the rib (15) into the second bore (16) such that a cylindrical external face (14) of the sleeve (10) delimits the annular cylindrical chamber,
   wherein the sleeve (10) is provided with radially outwardly projecting stop means (20, 22; 19) which axially fixes the sleeve (10) on the two shoulders (17; 18) of the rib (15), and
   wherein the stop means (20, 22; 19) comprises a radially outwardly, plastically deformed portion of the sleeve (10), by which the sleeve (10) is axially fixed on at least one of the two shoulders (17; 18).

2. The releaser according to claim 1, wherein in the cylindrical external face (14) of the sleeve (10) in a region located inside the second bore (16) there is provided a peripheral groove (21) which is open radially outwardly and in which a sealing ring sealing the sleeve (10) against the rib is arranged.

3. The releaser according to claim 2, wherein the two shoulders are provided on end faces of the rib (15) pointing axially away from one another, wherein the sleeve (10) carries, in an external, peripheral groove adjacent to the pressure chamber (9), a securing ring (22) resting on one of the two shoulders of the rib (15), and wherein an end of the sleeve (10) located on the side of the rib (15) remote from the pressure chamber (9) is plastically deformed toward the shoulder (17) provided there.

4. The releaser according to claim 2, wherein a peripheral groove (18) having axially facing lateral faces which from the two shoulders is provided in the second bore (16), and wherein the sleeve (10) is plastically deformed into the peripheral groove (18).

5. The releaser according to claim 3, wherein
   the wall thickness of the sleeve (10) in the region of plastic deformation (20) is reduced by an annular recess which increases the internal diameter of the sleeve (10).

6. The releaser according to claim 1, wherein the annular piston (7) has, at an end carrying the release bearing (27), an annular flange (39) which extends radially inwardly beyond the sleeve (10), wherein in the sleeve (10) there is rigidly inserted a supporting sleeve (41) which rests on the internal face thereof, which has a radially outwardly projecting collar (42) at one end resting on the end of the sleeve (10) axially remote from the rib (15), and which has a radially inwardly projecting collar (43) at its other end, and wherein a biasing spring (40) is fixed between the annular flange (39) and the radially inwardly projecting collar (43).

7. The releaser according to claim 6, wherein inside the supporting sleeve (41) and the biasing spring (40) supported thereon there is arranged a stop sleeve (44), carrying radially resilient tongues (46) at one end, with which it is axially positively fixed at the internal periphery of the annular flange (39) of the annular piston (7), the stop sleeve (44) being axially movably guided by its other end axially between the radially inwardly projecting collar (43) of the supporting sleeve (41) and the rib-side end of the sleeve (10) limiting the pressure chamber (9) on the internal face of this sleeve (10) and forming a stop allocated to the supporting sleeve (41) at this other end.

8. The releaser according to claim 1,
wherein the casing (3) has a cylinder wall which contains the first bore (5) and of which the radially external region comprises two cylindrical external faces (23, 24) having different external diameters and passing into one another in a step (25), the cylindrical external face (23) with the smaller external diameter being arranged remotely from the rib (15) and the cylindrical external face (24) with the greater external diameter being arranged adjacent to the rib (15) and wherein a stepped piston (8) which, together with the step (25) between the cylindrical external faces (23, 25), limits a further pressure chamber (51) and carries a further release bearing (26) is axially movable on the cylindrical external faces (23, 24).

9. The releaser according to claim 8, wherein the stepped piston (8) has, at its side guided on the smaller diameter cylindrical external face (23), an annular rib (28) with an end face extending perpendicularly to the direction of displacement of the stepped piston (,8), wherein the further release bearing (26) has a rotating bearing ring (38) and a non-rotating bearing ring (29) and, with the non-rotating, bearing ring (29), rests radially movably on the annular rib (28) and wherein the non-rotating bearing ring (29) is held on the annular rib (28) by a plurality of peripherally distributed spring clips (30) which act with a first end on the non-rotating bearing ring (29) and are shaped at their second end to a loop (31) which rests on the side of the annular rib (28) remote from the further release bearing (26).

10. The releaser according to claim 9, wherein a nose (32) which engages in a recess (33) in the annular rib (28) is shaped from the end of the spring clip (30) shaped into the loop (31).

11. The releaser according to claim 9,
wherein the first end of each spring clip (30) rests via a supporting and sealing disc (35) on the non-rotating bearing ring (29).

12. The releaser according to claim 11, wherein the non-rotating bearing ring (29) surrounds the rotating bearing ring (38) and wherein the supporting and sealing disc (35) has a collar (36) with which it is radially centred at the external periphery of the non-rotating bearing ring (29), has an annular bulge (37) which projects from the bearing ring (29) radially inside the collar (36) and on which the first ends of the spring clips (30) are fixed, rests on an end face of the non-rotating bearing ring (29) radially inside the annular bulge (37) and forms a labyrinthine seal radially internally with the rotating bearing ring (38).

13. The releaser according to claim 8, wherein the further pressure chamber (51) is a pneumatic pressure chamber.

14. The releaser according to claim 1, wherein the fluid pressure chamber is a hydraulic pressure chamber.

* * * * *